(12) United States Patent
Kon et al.

(10) Patent No.: US 7,808,650 B2
(45) Date of Patent: Oct. 5, 2010

(54) DISPLACEMENT MEASURING APPARATUS

(75) Inventors: Masahito Kon, Kanagawa (JP); Kayoko Taniguchi, Kanagawa (JP); Hideaki Tamiya, Kanagawa (JP); Yasuhiko Onodera, Kanagawa (JP); Hideki Tsuchiya, Kanagawa (JP); Akihiro Kuroda, Tokyo (JP)

(73) Assignee: Mori Seiki Co., Ltd., Nara (JP)

( * ) Notice: Subject to any disclaimer, the term of this patent is extended or adjusted under 35 U.S.C. 154(b) by 182 days.

(21) Appl. No.: 12/177,977

(22) Filed: Jul. 23, 2008

(65) Prior Publication Data

US 2009/0033946 A1 Feb. 5, 2009

(30) Foreign Application Priority Data

Aug. 1, 2007 (JP) ............................. 2007-201283

(51) Int. Cl.
*G01B 11/02* (2006.01)
(52) U.S. Cl. ...................................... 356/499
(58) Field of Classification Search ................ 356/485, 356/488, 490, 493, 494, 499, 500, 508, 509, 356/512, 521
See application file for complete search history.

(56) References Cited

U.S. PATENT DOCUMENTS

| | | | | |
|---|---|---|---|---|
| 4,529,964 A | * | 7/1985 | Minami et al. | 341/13 |
| 5,066,130 A | * | 11/1991 | Tsukiji et al. | 356/494 |
| 6,449,035 B1 | * | 9/2002 | Batchelder | 356/237.1 |
| 6,838,688 B2 | * | 1/2005 | Aoki | 250/559.29 |
| 2008/0186491 A1 | * | 8/2008 | Baxter et al. | 356/364 |
| 2009/0115987 A1 | * | 5/2009 | Butler et al. | 355/67 |
| 2009/0231561 A1 | * | 9/2009 | Arai | 355/53 |

FOREIGN PATENT DOCUMENTS

| | | |
|---|---|---|
| JP | 2002-267493 | 9/2002 |
| JP | 2006-177876 | 7/2006 |

* cited by examiner

*Primary Examiner*—Gregory J Toatley, Jr.
*Assistant Examiner*—Scott M Richey
(74) *Attorney, Agent, or Firm*—Sonnenschein Nath & Rosenthal LLP

(57) ABSTRACT

Disclosed is a displacement measuring apparatus that includes a composite scale having a magnetic pattern and a diffraction grating each aligned in a direction of measuring axis, and a detector head moving in a direction of measuring axis relative to the composite scale. The detector head has a magnetic detection unit detecting a magnetic field exerted by the magnetic pattern to generate first reproduced signals, a light source irradiating the diffraction grating with light, and an optical detection unit detecting the light diffracted by the diffraction grating to generate second reproduced signals. In composite scale, the magnetic pattern and the diffraction grating are arranged such that a pitch of the first reproduced signals is larger than that of the second reproduced signals.

5 Claims, 5 Drawing Sheets

DISPLACEMENT MEASURING APPARATUS

CROSS REFERENCES TO RELATED APPLICATIONS

The present invention contains subject matter related to Japanese Patent Application JP 2007-201283 filed in the Japanese Patent Office on Aug. 1, 2007, the entire contents of which being incorporated herein by reference.

BACKGROUND OF THE INVENTION

1. Field of the Invention

The invention generally relates to displacement measuring apparatuses. More particularly, the invention relates to a displacement measuring apparatus for use in measurements of linear and rotational displacements.

2. Description of the Related Art

Displacement measuring apparatuses are generally known as the apparatus for implementing precise measurements of linear or rotational displacements, and other similar displacements, which are implemented with a scale and a detector head. The measuring apparatuses have been widely used, for example, in a packaging equipment of electronic components, which generally requires precise positioning control of materials on conveyance, and in a measuring equipment of the size of parts and components. The detection system of the measuring apparatuses may be divided broadly into two types, magnetic and optical.

As to the known displacement measuring apparatus of magnetic type, for example, one approach has been disclosed in Japanese Unexamined Patent Application Publication No. 2002-267493, and a magnetic encoder is therein described concerning a magnetic encoder utilized for detecting the position and controlling movable materials.

The magnetic encoder disclosed in the Application Publication No. 2002-267493 includes at least a magnetic scale including a magnetic pole pattern, a detection element which is provided facing the magnetic pole pattern and includes plural detection patterns for detecting the magnetic field, a holder for holding the detection element, and a processing circuit which is connected to the detection element and configured to implement rectangular processing of input signals obtained from the detection element, characterized in that the distance between one of the plural detection patterns and the magnetic scale is approximately equal to that between other detection patterns and the magnetic scale.

According to the magnetic encoder disclosed in the Application Publication No. 2002-267493, the amount of displacement of the detection element can be measured relative to the magnetic scale by detecting the magnetic pole pattern of the magnetic scale by means of the detection element.

As to the known displacement measuring apparatus of optical type, for example, there disclosed in Japanese Unexamined Patent Application Publication No. 2006-177876 is a displacement measuring apparatus of laser interference type.

The displacement measuring apparatus disclosed in the Application Publication No. 2006-177876 is provided which includes at least a scale including a diffraction grating, and a detector head unit which is provided to be movable along the direction of measuring axis relative to the scale and configured to emit coherent light toward the scale as well as to receive the light diffracted by the scale. In the displacement measuring apparatus, the detector head unit includes a light source for emitting coherent light, a demultiplexing means for demultiplexing the coherent light emitted from the light source into two light beams, optical elements which are provided for each of the light beams outputted from the demultiplexing means and configured to reflect the light beams and subsequently to render the light beams be incident to the scale as incident beams, and retroreflective means which is provided for each of diffracted light beams generated by diffracting the two light beams previously rendered incident to the scale by means of the diffraction grating and are configured to retroreflect the diffracted light beams and subsequently to render the diffracted light beams be incident as recursive light beams. In the displacement measuring apparatus, the incident beams and the recursive light beams are rendered incident perpendicular to the grooves of the diffraction grating and that the angle between the incident beams and the normal vector of the scale is larger than the angle between the recursive light beams and the normal vector of the scale.

According to the displacement measuring apparatus disclosed in the Application Publication No. 2006-177876, by detecting the light diffracted by the diffraction grating which is formed on the scale, by the optical detection unit, the amount of displacement can be measured relative to the scale.

SUMMARY OF THE INVENTION

However, in the displacement measuring apparatus of magnetic type such as disclosed in the Application Publication No. 2002-267493, there gives rise to a difficulty when the pitch of the magnetic pattern is decreased. That is, it maybe necessary to concomitantly decrease the separation between the magnetic scale and detection element (magnetic detection unit) which are formed to maintain each other in a non-contact manner. Therefore, the pitch of the magnetic pattern (i.e., pitch of reproduced signals detected by the detection element) is considered in general to be approximately from 40 to 5000 μm, and it has been regarded difficult to further decrease the pitch of the magnetic pattern and to thereby achieve greater precision and higher resolution.

Also, in the displacement measuring apparatus of optical type such as disclosed in the Application Publication No. 2006-177876, by reflecting the light diffracted by a diffraction grating and irradiating again the diffraction grating, the pitch of reproduced signals, which are optically detected by photoreceptor element, can be decreased. Therefore, the pitch of the reproduced signals detected optically is considered in general to be approximately from 0.1 to 40 μm, and measurements have been achieved with greater precision and higher resolution. However, in this displacement measuring apparatus of optical type, the greater precision and higher resolution may not be attained when narrowing the pitch of reproduced signals, and hence the speed and response are delayed concomitantly during the measurement of displacement values.

According to embodiments of the invention, there is provided a displacement measuring apparatus capable of performing measurements of the amount of displacement with higher speed and response and with greater precision and higher resolution.

A displacement measuring apparatus includes a composite scale having a magnetic pattern and a diffraction grating each aligned in a direction of measuring axis, and a detector head moving in a direction of measuring axis relative to the composite scale. The detector head has a magnetic detection unit detecting a magnetic field exerted by the magnetic pattern to generate first reproduced signals, a light source irradiating the diffraction grating with light, and an optical detection unit detecting the light diffracted by the diffraction grating to generate second reproduced signals. In the composite scale of the displacement measuring apparatus, the magnetic pattern and the diffraction grating are arranged such that a pitch of the first reproduced signals is larger than that of the second reproduced signals.

In the displacement measuring apparatus according to an embodiment of the present invention, the magnetic detecting unit detects the magnetic field generated by the magnetic pattern and measures an amount of displacement with higher speed and response, and the optical detection unit detects the light diffracted by the diffraction grating and measures the amount of displacement with greater precision and higher resolution.

BRIEF DESCRIPTION OF THE DRAWINGS

The preferred embodiments of the invention will be described in detail with reference to the following figures.

FIG. 4A is a cross-sectional view of the composite scale at the step with a resin layer formed of an ultraviolet curable-resin on a base material which is previously provided with a magnetic pattern. FIG. 4B is a view illustrating an original plate in a state prior to being pressed against the resin layer, FIG. 4C is a view illustrating the resin layer irradiated with ultraviolet beams while being pressed against the original plate, FIG. 4D is a view illustrating a diffraction grating formed on the resin layer after having removed the original plate, FIG. 4E is a view illustrating a reflective film formed on the resin layer having the diffraction grating thereon, and FIG. 4F is a view illustrating a protective film formed on the resin layer having the reflective film thereon;

DESCRIPTION OF THE PREFERRED EMBODIMENTS

Figure 1:
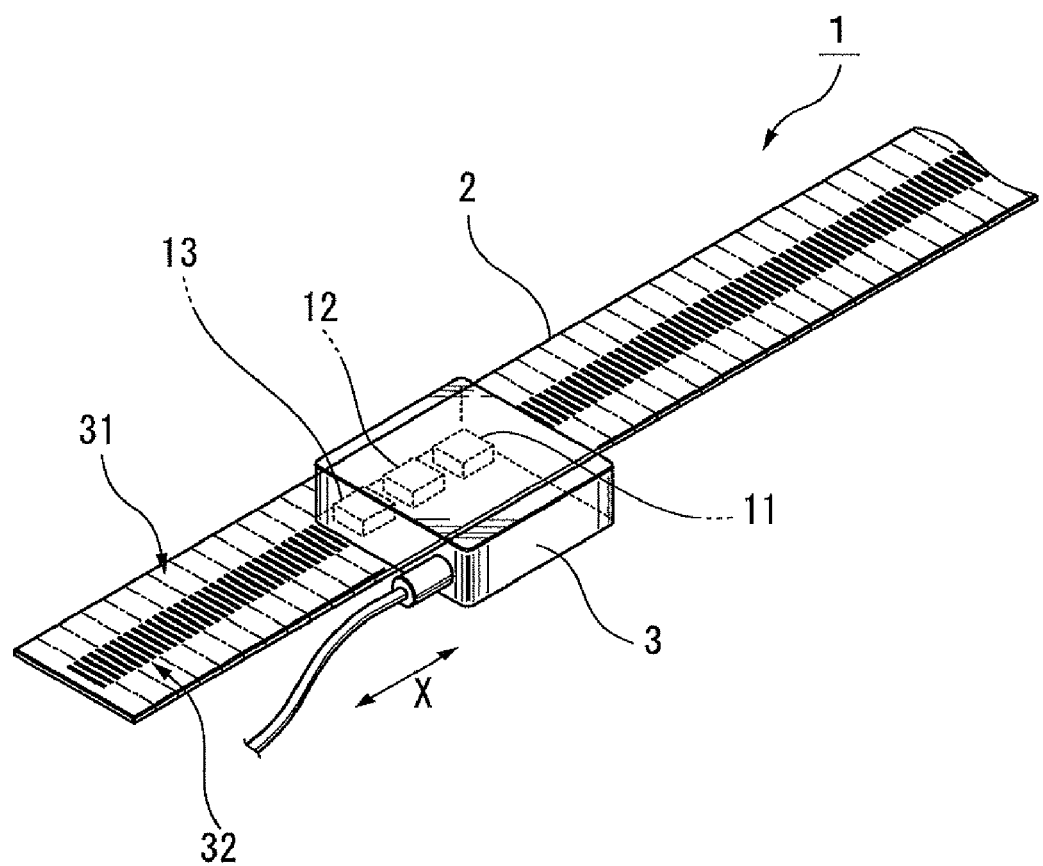
FIG. 1 is a perspective view illustrating a displacement measuring apparatus according to a first embodiment of the present invention.

The invention will be described hereinbelow on a variety of embodiments of displacement measuring apparatuses by referring to the accompanying drawings. It is not intended to be exhaustive or to limit the invention to those disclosed in the embodiments and illustrated in the drawings.

FIG. 1 is a perspective view illustrating a displacement measuring apparatus according to a first embodiment of the present invention. The displacement measuring apparatus 1 is configured to carry out measurements of linear displacements, namely, as the so-called linear type displacement measuring apparatus.

Referring to FIG. 1, the displacement measuring apparatus 1 includes at least a composite scale 2 having a magnetic pattern 31 and a diffraction grating 32, each aligned in the direction X of measuring axis (or, hereinafter referred to as "measuring axis direction X"), and a detector head 3 moving in the measuring axis direction X relative to the composite scale 2.

The detector head 3 includes at least a magnetic detection unit 11, a light source 12, and an optical detection unit 13. The magnetic detection unit 11 included in the detector head 3 is configured to detect the magnetic field generated by the magnetic pattern 31 of the composite scale 2, where first reproduced signals are generated. As the magnetic detection unit 11, an MR (magneto-resistive) element is employed, for example, which is capable of detecting the magnetic field utilizing the magneto-resistive effect.

The light source 12 in the detector head 3 is a point light source which is configured to irradiate the diffraction grating 32 of the composite scale 2 with light. As the light source 12, an LED (light emitting diode), a semiconductor laser, and the like may be employed, for example. The optical detection unit 13 is configured to detect (or photo-receive) the light diffracted by the diffraction grating 32, where second reproduced signals are generated. As the optical detection unit 13, a photodiode (PD) may be employed.

Figure 2:
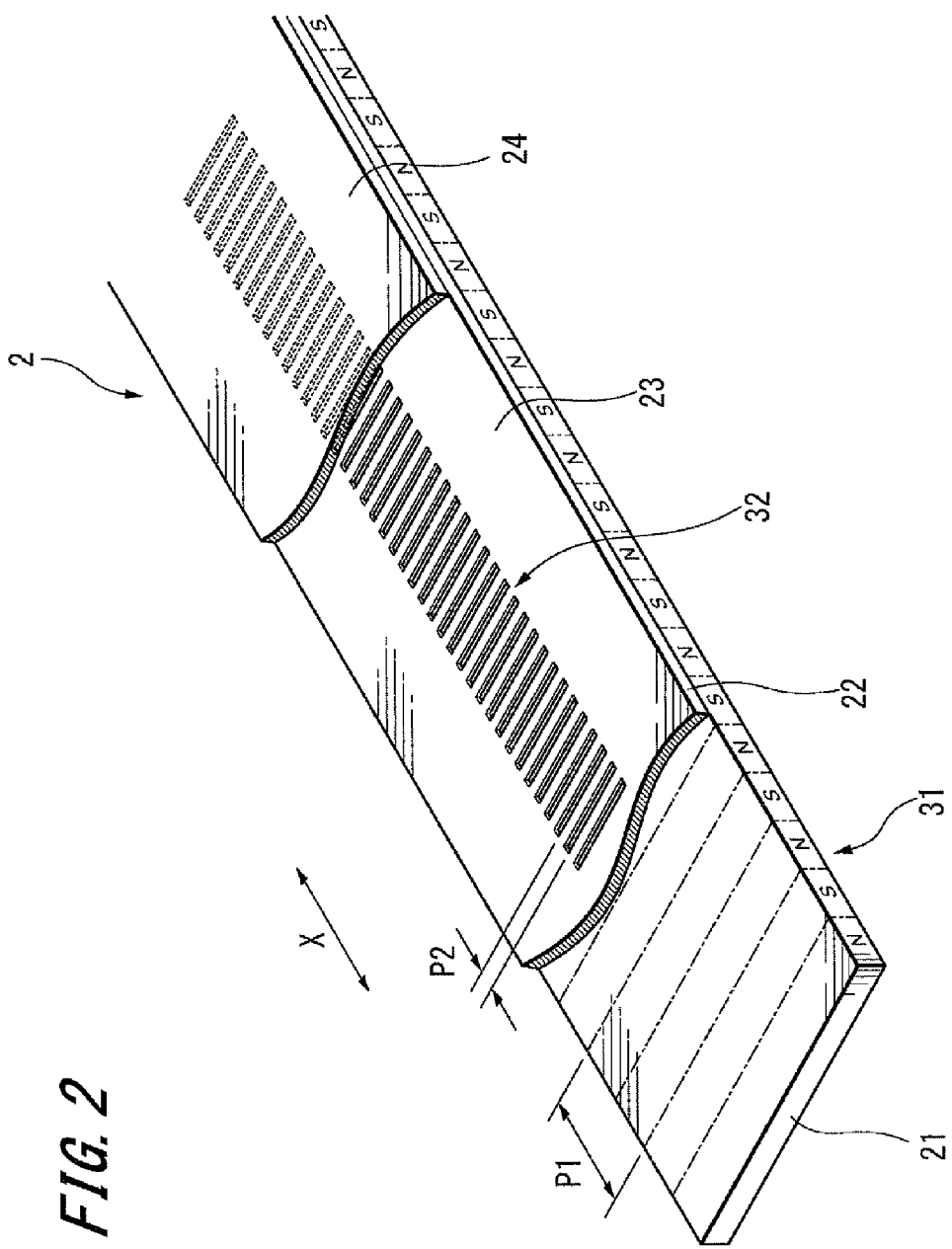
FIG. 2 is a view illustrating the structure of the composite scale in the displacement measuring apparatus according to the first embodiment of the present invention.
Figure 3:
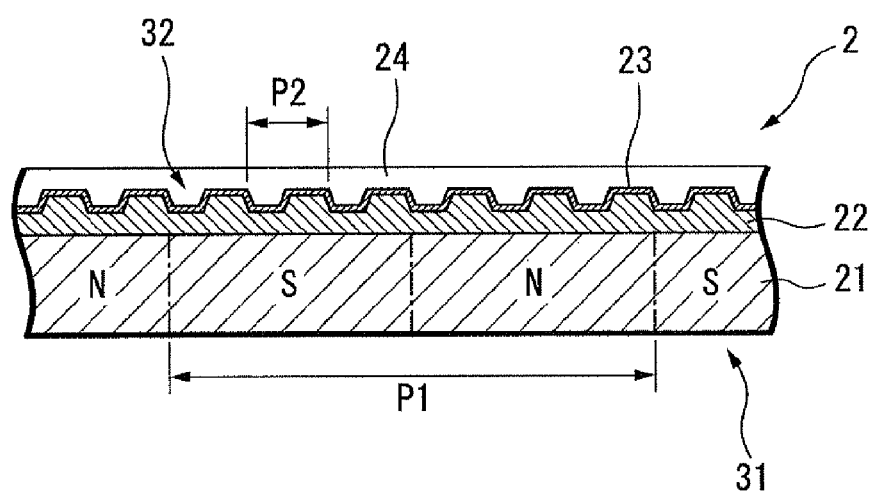
FIG. 3 is a side view illustrating a longitudinal section of the composite scale in the displacement measuring apparatus partially enlarged according to the first embodiment of the present invention.

FIGS. 2 and 3 are views illustrating the composite scale 2 in the displacement measuring apparatus 1, where FIG. 2 is a perspective view showing the configuration of the composite scale 2 and FIG. 3 is a longitudinal section of the composite scale 2.

Referring to FIGS. 2 and 3, the composite scale 2 includes a base material 21 provided thereon with the magnetic pattern 31, a resin layer 22 superposed on the base material 21 and provided with the diffraction grating 32 on one of the surfaces of the resin layer 22 opposite to the base material 21, a reflective film 23 formed on the other surface of the resin layer 22, and a protective film 24 covering the resin layer 22 provided thereon with the reflective film 23.

The base material 21 in the composite scale 2 includes magnetic material such as iron, cobalt, and the like, to have a structure of thin strip shape (tape-shaped) extending along the measuring axis direction X. The base material 21 includes the magnetic pattern 31. The magnetic pattern 31 is formed by implementing a magnetic recording of a sequence of alternately repeated N and S magnetic poles along the measuring axis direction X, having a pitch P1 of the repetition. By detecting the magnetic field generated by the magnetic pattern 31 by means of the magnetic detection unit 11 in the detector head 3, the amount of relative displacement between the composite scale 2 and the detector head 3 can be measured.

While the composite scale according to the present embodiment has been described herein above with the configuration including the base material 21 which is formed employing magnetic material, and the magnetic pattern 31 which is provided by carrying out magnetic recording of the sequence of alternately repeated N and S poles, the base material in the present invention is not limited to the above illustration. For example, the base material of the invention may be formed alternatively employing nonmagnetic materials such as aluminum, glass, and the like, which is provided on the surface thereof with magnetic components by coating so as to form a magnetic pattern with an alternate sequence of the N and S poles.

The resin layer 22 of the composite scale 2 is formed by disposing an ultraviolet (UV) curable-resin, as an example of photo-curable resins, on top of one of the surfaces of the base material 21. The material for forming the resin layer 22 is not limited to photo-curable resins such as the abovementioned ultraviolet curable-resin, but thermosetting resins such as an epoxy resin (EP) and the like, may alternatively be employed, for example. In addition, on the other surface of the base material 21 opposing to the resin layer 22, the diffraction grating 32 is formed.

The diffraction grating 32 has a plurality of slits formed thereon, which are aligned parallel with each other and perpendicular to the measuring axis direction X, where the slits are arranged in the direction X to be spaced with a pitch P2. The diffraction grating 32 is therefore formed on the same track as the magnetic pattern 31 on the base material 21. Upon irradiation with the light emitted from the light source 12 in the detector head 3, the diffraction grating 32 generates diffracted light. By detecting thus diffracted light by the optical detection unit 13 in the detector head 3, the amount of relative displacement between the composite scale 2 and the detector head 3 can be measured.

The pitch P1 of the magnetic pattern 31 formed on the base material 21 is set herein to be larger than the pitch P2 of the diffraction grating 32 formed on the resin layer 22. In the present embodiment the pitch P1 of the magnetic pattern 31 is set at 1000 μm so that the pitch of the first reproduced signals detected by the magnetic detection unit 11 is configured to be 1000 μm. In addition, the pitch P2 of the diffraction grating 32 is set at 4 μm. By irradiating the diffraction grating 32 with light four times, the pitch of the second reproduced signals detected by the optical detection unit 13 is configured to be 1.0 μm.

Namely, the pitch of the first reproduced signals generated from the detection by the magnetic method is larger than the second reproduced pitch generated from the optical detection. As a result, when the amount of displacement is measured with the first reproduced signals generated from the detection of the magnetic type, high speed and more responsive performance of the measurement can be realized. Alternatively, more detailed and high resolution performances can be achieved when measured with the second reproduced pitch generated from the optical type detection.

The reflective film 23 of the composite scale 2 is formed on the surface of the resin layer 22 by depositing a film of chromium (Cr), as a material with high hardness yet having suitable damage resistance, utilizing evaporation, sputtering, and other similar film deposition methods. While chromium is employed for forming the reflective film 23 hereinabove in the present embodiment, the material for the reflective film in the present invention is not limited to the above illustration. The reflective film of the invention may be formed alternatively employing other metals such as gold, platinum, aluminum, and the like.

The protective film 24 is formed with a transparent material capable of passing through the light emitted from the light source 11. An example of the material for the protective film 24 includes polycarbonate (PC) that can be formed as a film. In this manner, an adhesive agent may preferably be applied to one of the surfaces of the protective film 24. Thus, the reflective film 23 can be prevented from contamination or blemish by covering the resin layer 22 having the reflective film 23 thereon with the protective film 24. As a result, the diffracted light can be obtained in a prescribed manner to carry out precise displacement measurements, the reliability of the displacement measuring apparatus 1 can significantly be increased.

Incidentally, the protective film of the invention is not limited to the abovementioned film of polycarbonate. Examples of the protective film of the invention not only include the films of polyethylene terephthalate (PET), but also include a film with other structure, such as a transparent resin material of polycarbonate (PC).

In addition, the composite scale 2 according to the present embodiment includes the protective film 24 formed on the resin layer 22 having the reflective film 23 thereon; however, the composite scale 2 of the present embodiment may alternatively include no protective film 24. In this case, the reflective film 23 formed on the resin layer 22 serves as the surface of the composite scale 2.

Next, a method of fabricating the composite scale 2 having the aforementioned structure will be described with reference to FIGS. 4A through 4F. FIGS. 4A through 4F are cross-sectional views of the composite scale 2 at various fabrication steps.

Figure 4A:
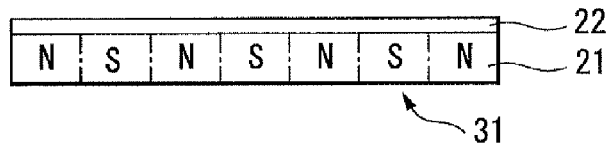
FIGS. 4A through 4F are cross-sectional views illustrating the composite scale included in the displacement measuring apparatus during various steps in the fabrication process according to an embodiment of the invention.

First, a magnetic pattern 31 of a pitch P1 is formed on a base material 21 by implementing magnetic recording of the sequence of alternately repeated S and N magnetic poles. Next, as shown in FIG. 4A, a resin layer 22 is formed by disposing an ultraviolet curable-resin on one of the surfaces of the base material 21 which is previously provided with the magnetic pattern 31. In this case, the adhesion between the base material 21 and the resin layer 22 formed of ultraviolet curable-resin maybe improved by additionally providing the process of roughening the surface of the base material 21.

Moreover, the ultraviolet curable-resin may alternatively be formed as a sheet having the size appropriate to the base material 21. In this case, the sheet-like ultraviolet curable-resin is attached onto the one of the surfaces of the base material 21.

Figure 4B:
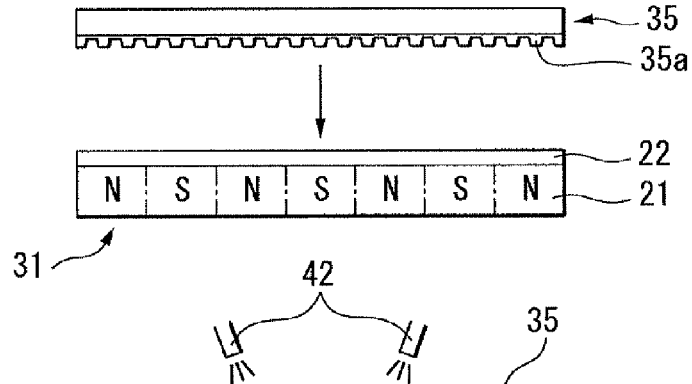

Subsequently, as shown in FIG. 4B, an original plate 35 which is provided thereon with a master (master grating) 35a corresponding to a diffraction grating 32, is pressed against the resin layer 22. Namely, the resin layer 22 is subjected to pressing process using the original plate 35. This original plate 35 is provided with a transparent material capable of passing through ultraviolet light, such as silica glass and the like, for example. The master 35a is subjected to a treatment for promoting its capability of suitably releasing the ultraviolet curable-resin.

Figure 4C:
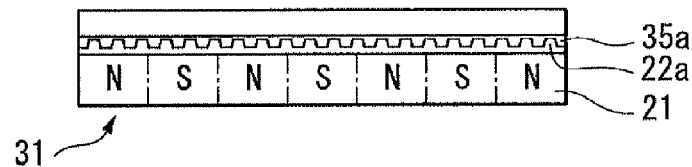

Next, as shown in FIG. 4C, ultraviolet light beams are irradiated from the side of the original plate 35 by an ultraviolet light irradiation apparatus 42. The ultraviolet beams are thereby irradiated onto the resin layer 22 passing through the original plate 35, and the resin layer 22 is hardened while remaining pressed and deformed against the original plate 35.

Figure 4D:
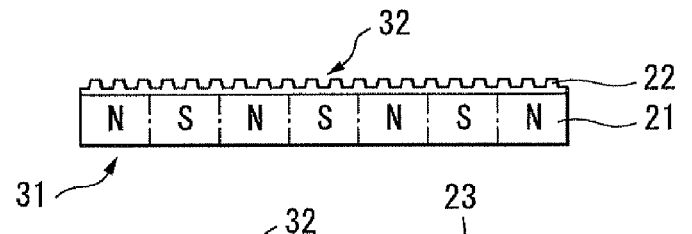

Subsequently, as shown in FIG. 4D, the original plate 35 is removed from thus hardened resin layer 22, where the diffraction grating 32 with a pitch P2 is formed on the resin layer 22. Since the releasing process has been made earlier on the master 35a of the original plate 35, the original plate 35 can be removed from the resin layer 22 with ease. As a result, an undesirable deformation of the hardened resin layer 22 can be prevented, and the diffraction grating 32 can be formed with a sufficient accuracy.

Figure 4E:
Figure 4F:
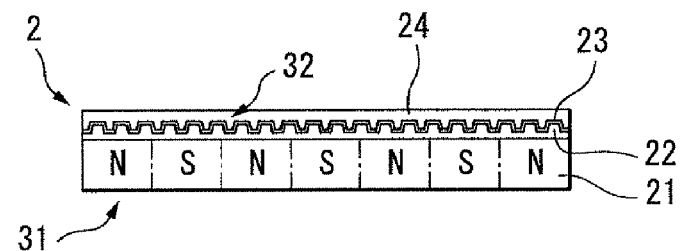

Thereafter, as shown in FIG. 4E, chromium (Cr) is deposited to form a film on the surface of the resin layer 22 by evaporation, sputtering, and other suitable deposition methods, where a reflective film 23 is formed. In addition, as shown in FIG. 4F, a protective film 24 is formed on the resin layer 22 provided with the reflective film 23, where a composite scale 2 is fabricated.

Incidentally, in the case where the resin layer 22 is formed of thermosetting resin, a heating device is used for hardening the thermosetting resin instead of the ultraviolet light irradiation apparatus 42 shown in FIG. 4C. Since other process steps for forming the resin layer 22 employing thermosetting resin are similar to those mentioned earlier for forming the layer 22 with the ultraviolet curable-resin, the repeated description thereof is herewith abbreviated.

As described herein above, the composite scale 2 included in the displacement measuring apparatus 1 can be formed through various steps in the fabrication process. An example thereof includes the steps of forming the magnetic pattern 31 on the base material 21, forming the resin layer 22 on the base material 21 provided thereon with the magnetic pattern 31, pressing the master 35a corresponding to the original plate 35 against the resin layer 22 and subsequently forming the diffraction grating 32, forming the reflective film 23 on the resin layer 22 provided thereon with the diffraction grating 32, and forming the protective film 24 on the resin layer 22 provided thereon with the reflective film 23.

By fabricating the composite scale 2 mentioned above, the diffraction grating 32 can be formed without using expensive manufacturing equipments and with relative ease, employing few manufacturing person-hours, where a significant cost-reduction can be achieved. Moreover, the diffraction grating 32 can be formed in a minute pitch with a sufficient accuracy, where more detailed and high resolution performances can be achieved during displacement measurements which are carried out by detecting the light which is diffracted by the thus formed diffraction grating 32, by means of the optical detection unit 13.

While the structure of thin tape shape has been illustrated hereinabove for the composite scale in the present embodiment, the structure is not limited to that of tape-shape for the composite scales of the invention. For forming the composite scale of the invention, a further structure may alternatively be employed, where the base material is formed of metal such as stainless steel, and glass, etc., as mentioned earlier, to be a composite scale of lengthy shape having a suitable thickness.

Next, a method of measuring the amount of displacement with the displacement measuring apparatus 1 will be described. The displacement measuring apparatus 1 is configured to carry out measurements of the amount of displacement of the detector head 3 relative to the composite scale 2, either by detecting the magnetic field which is generated by the magnetic pattern 31 of the composite scale 2, by means of the magnetic detection unit 11 in the detector head 3, or by detecting the light which is diffracted by diffraction grating 32, by means of the optical detection unit 13.

The magnetic pattern 31 of the compound scale 2 is formed with the pitch P1 larger than the pitch P2 of the diffraction grating 32, and the pitch of the first reproduced signals generated by the magnetic detection unit 11 is larger than the pitch P2 of the second reproduced signals generated by the optical detection unit 13. Therefore, by implementing the magnetic detection configured to detect the magnetic field generated from the magnetic pattern 31 by means of the magnetic detection unit 11 of the detector head 3, the displacement amount can be measured with high speed and response. Alternatively, by implementing the optical detection configured to detect the light diffracted with the diffraction grating 32 by means of the optical detection unit 13 of the detector head 3, the displacement amount can be measured in greater detail and with higher resolution.

Moreover, by carrying out measurements first by the magnetic detection, and subsequently carrying out further measurements, by the optical detection, of the portions which may not be carried out by the magnetic detection, the measurements can be achieved not only in high speed and response, but also in greater detail as well as high resolution.

Figure 5:
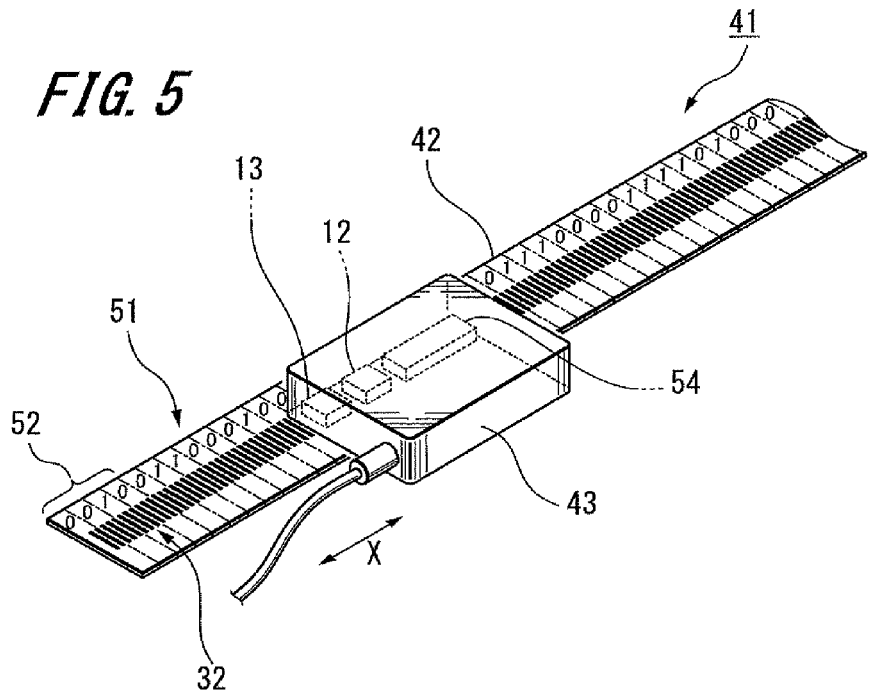
FIG. 5 is a perspective view illustrating a displacement measuring apparatus according to a second embodiment of the present invention.

Subsequently, a displacement measuring apparatus according to a second embodiment of the invention will be described with reference to FIGS. 5 and 6. FIG. 5 is a perspective view illustrating the displacement measuring apparatus according to a second embodiment of the invention.

Referring to FIG. 5, the displacement measuring apparatus 41 includes at least a composite scale 42 and a detector head 43 in a similar manner to the displacement measuring apparatus 1 according to the first embodiment. The displacement measuring apparatus 41 of the second embodiment is configured to measure the absolute position of the composite scale 42 relative to the detector head 43, that is, to be capable of performing the so-called absolute type measurements.

As shown in FIG. 5, the composite scale 42 in the displacement measuring apparatus 41 has a configuration similar to the composite scale 2 of the first embodiment except only for the structure of a magnetic pattern 51. Therefore, the magnetic pattern 51 is primarily described herein. The components in common with those in the composite scale 2 are indicated with identical numerical representations and the repeated description thereof is herewith abbreviated.

The magnetic pattern 51 of the composite scale 42 represents a code 52 that can magnetically read position information (hereinafter referred to as "magnetic code"). The magnetic code 52 is described as follows. There formed on the base material 21 of the composite scale 42 are the portions each magnetically recorded corresponding to "1" information and other portions without magnetic recording each indicating "0" information. The information "1" may be formed by magnetically recording onto the base material 21 either with N or S magnetic pole, or alternatively with N and S poles in combination.

The magnetic code 52 is expressed by numerical values of a plurality of digits, each having "0" or "1" information and being provided consecutively along the measuring axis direction X, so that the numerical values differ from each other. As shown in FIG. 5, in the case where the magnetic code 52 is expressed by numerical values of four digits, the expression follows sequentially from one end, as "0010", "0100", "1001" and so on. By detecting this magnetic code 52, an arbitrary position on the composite scale 42 can be determined.

The detector head 43 in the displacement measuring apparatus 41 has a configuration similar to the detector head 3 of the first embodiment except only for the structure of the magnetic detection unit 54. Therefore, the magnetic detection unit 54 is primarily described herein. The components in common with those included in the detector head 3 are indicated with identical numerical representations and the repeated description thereof is herewith abbreviated. The magnetic detection unit 54 includes four MR elements corresponding to the magnetic code 52 of four digits (four bits) and the interval between neighboring MR elements is set to be equal to the length corresponding to one digit on the magnetic codes 52.

Figure 6:
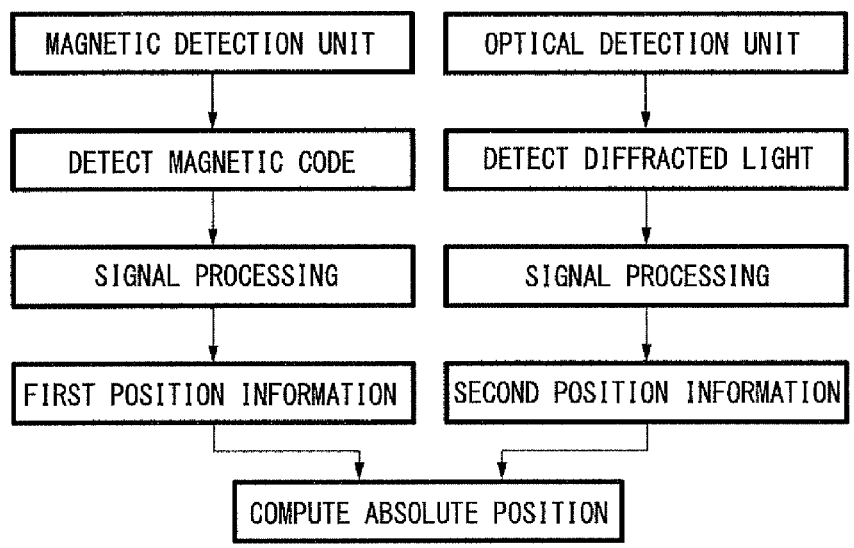
FIG. 6 is a block diagram illustrating absolute type measurements with the displacement measuring apparatus according to the second embodiment of the present invention.

Next, the absolute type measurement with the displacement measuring apparatus 41 will be de with reference to FIG. 6. FIG. 6 is a block diagram illustrating the absolute type measurement with the displacement measuring apparatus of FIG. 5. As shown in FIG. 6, the absolute type measurement with the displacement measuring apparatus 41 is carried out by the magnetic detection with the magnetic detection unit 54 in combination with the optical detection with the optical detection unit 13.

With regard to the magnetic detection, the magnetic detection unit 54 first detects a magnetic code 52. Subsequently, signal processing is performed based on the value (voltage) detected by the magnetic detection unit 54, where first position information on the detection head 43 relative to the composite scale 42 is generated. The first position information is generated herein to the precision of 1.0 mμ unit with the same order as the pitch of the second reproduced signal detected by the optical detection unit 13.

With regard to the optical detection, on the other hand, the optical detection unit 13 first detects the light diffracted with the diffraction grating 32. Subsequently, signal processing is performed based on the value (voltage) detected by the optical detection unit 13, where second position information on the detection head 43 relative to the composite scale 42 is generated. The second position information is generated herein as the value smaller than the aforementioned pitch (1.0 mμ) of the second reproduced signals detected by the optical detection unit 13.

Thereafter, by merging the first and second position information, the absolute position of the detection head 43 relative to the composite scale 42 is computed. Since the absolute position of the detection head 43 is thus measured by the magnetic detection and optical detection in combination, the detection of the absolute position can be carried out with high precision.

While the magnetic code 52 is expressed by numerical values of four digits (four bits) each having "0" or "1" in the present embodiment, the code 52 may alternatively be expressed by numerical values of five or more digits. In this regard, the number of MR elements included in the magnetic detection unit is increased according to the number of the magnetic code. With the increase in the number of the magnetic code, the composite scale can be realized to be capable of measuring a longer distance by the absolute measurement method.

As described hereinabove, it is feasible with the displacement measuring apparatus according to the embodiments of the invention that by detecting the magnetic field generated from the magnetic pattern with the magnetic detector unit in the detector head, the displacement amount of the detector head relative to the composite scale can be measured with high speed and response. In addition, by detecting the light that is diffracted by the diffraction grating formed on the composite scale, with the optical detection unit of the detector head, the displacement amount can be measured in greater detail and with higher resolution.

Consequently, the desirable measurement method can be selected arbitrary between the abovementioned measurement methods, one being magnetic of realizing high speed and high response measurement and the other being optical for achieving more detailed and with higher resolution measurements, where the measurements will be feasible utilizing more suitable method depending on the status, and intention of the present use. Alternatively, by carrying out measurements first by the magnetic detection, and subsequently carrying out further measurements by the optical detection, of the portions which may not be measured by the magnetic detection, the measurements can be achieved not only high speed and response, but also more detailed and with higher resolution.

In addition, the composite scale according to the embodiment of the invention has the structure having the base material and the resin film formed on one of the surfaces of the resin material. At the same time, the magnetic pattern is formed on the base material and the diffraction grating is formed on the resin film. As a result, the magnetic pattern and diffraction grating can be formed on the same track of the scale, where the reduction in size for the composite scale and for the measuring apparatus as a whole can be achieved.

Still in addition, since the diffraction grating is formed on the resin layer with photo-curable or thermosetting resin, diffraction gratings can be formed minutely defined with high precision only by the process of hardening while pressed against the original plate, with high precision and with relative ease. Moreover, the diffraction gratings are formed without having expensive manufacturing equipments and few manufacturing person-hours, where a significant cost-reduction can be achieved.

Moreover, by covering the resin layer that is provided thereon with the reflection layer, with the protective film, the reflective film can be prevented from the occurrence of contamination or blemish. As a result, the diffracted light can be obtained continuously in a prescribed manner, and the durability and reliability of the measurement can be improved. In addition, since the scale is formed to be tape-shaped by employing the thin strip shaped base material, the displacement measuring apparatus can be provided with the excellent transportability.

In addition, since the magnetic code from which position information can be read is provided as the magnetic pattern, absolute type measurements can be feasible. Moreover, since the absolute type measurements are carried out by merging the first position information obtained by detecting the magnetic code and the second position information obtained by detecting the light diffracted with the diffraction grating, the detection of the absolute position can be carried out with high precision.

Although specific embodiments of, and examples for, this invention have been illustrated, it is not intended to be exhaustive or to limit the invention to those disclosed in the embodiments and illustrated in the drawings, and various modifications are possible without departing from the scope of the invention. For example, while the displacement measuring apparatus has been shown as the linear type apparatus configured to make measurements of linear displacements, the measuring apparatus of the invention may be applied also to the rotary type capable of measuring rotational displacements.

It should be understood by those skilled in the art that various modifications, combinations, sub-combinations and alterations may occur depending on design requirements and other factors insofar as they are within the scope of the appended claims or the equivalents thereof.

What is claimed is:

1. A displacement measuring apparatus, comprising:
   a composite scale having a magnetic pattern and a diffraction grating each aligned in a direction of a measuring axis; and
   a detector head moving in a direction of measuring axis relative to the composite scale, the detector head having (a) a magnetic detection unit detecting a magnetic field exerted by the magnetic pattern to generate first reproduced signals, (b) a light source irradiating the diffraction grating with light, and (c) an optical detection unit detecting the light diffracted by the diffraction grating to generate second reproduced signals,
   wherein,
      the magnetic pattern and the diffraction grating are formed on a same track of the composite scale, and
      the magnetic pattern and the diffraction grating are arranged such that a pitch of the first reproduced signals is larger than that of the second reproduced signals.

2. The displacement measuring apparatus according to claim 1, wherein the composite scale includes:
   a base material provided thereon with the magnetic pattern,
   a resin layer formed of photo-curable resin or thermosetting resin and superposed on the base material and provided on a first surface of the resin layer opposite to the base material provided with the diffraction grating, and a reflective film formed on a second surface opposite to the first surface of the resin layer.

3. The displacement measuring apparatus according to claim 2, wherein the composite scale includes a protective film covering the resin layer, the resin layer provided thereon with the reflective film.

4. The displacement measuring apparatus according to claim 1, wherein the magnetic pattern is formed by implementing a magnetic recording of a sequence of alternately repeated N and S magnetic poles in the direction of measuring axis.

5. The displacement measuring apparatus according to claim 1, wherein the magnetic pattern is configured to magnetically represent a code from which position information is readable.

* * * * *